United States Patent
Ramus et al.

(10) Patent No.: US 7,017,408 B2
(45) Date of Patent: Mar. 28, 2006

(54) ELECTRO-OPTIC LIQUID LEVEL SENSING SYSTEM FOR AIRCRAFT BEVERAGE BREWING

(75) Inventors: Sebastien A. Ramus, Overland Park, KS (US); Keith R. DeBald, Gardner, KS (US); Joseph C. Dettmer, Overland Park, KS (US); Winston S. Fliess, Olathe, KS (US)

(73) Assignee: Be Intellectual Property, Inc., Wellington, FL (US)

( * ) Notice: Subject to any disclaimer, the term of this patent is extended or adjusted under 35 U.S.C. 154(b) by 36 days.

(21) Appl. No.: 10/779,329

(22) Filed: Feb. 13, 2004

(65) Prior Publication Data

US 2005/0178197 A1   Aug. 18, 2005

(51) Int. Cl.
*G01F 23/292* (2006.01)
(52) U.S. Cl. ........................................ 73/293
(58) Field of Classification Search .................. 73/293; 141/198
See application file for complete search history.

(56) References Cited

U.S. PATENT DOCUMENTS

| 3,741,656 | A | * | 6/1973 | Shapiro | 356/342 |
| 4,247,784 | A | * | 1/1981 | Henry | 250/577 |
| 4,873,863 | A | * | 10/1989 | Bruhl et al. | 73/49.2 |
| 6,082,419 | A | * | 7/2000 | Skell et al. | 141/198 |
| 2003/0133479 | A1 | * | 7/2003 | Morikawa et al. | 372/36 |
| 2003/0223221 | A1 | * | 12/2003 | Yeh et al. | 362/84 |

* cited by examiner

Primary Examiner—Hezron Williams
Assistant Examiner—Paul M. West
(74) Attorney, Agent, or Firm—Fulwider Patton LLP

(57) ABSTRACT

The electro-optic liquid level sensing system detects a level of liquid in a container having an upper opening, such as for a server container of a beverage maker for a transport system, such as for aircraft, trains, trucks, buses and the like. A support housing mates with the upper opening of the container, and a primary liquid level sensor is mounted in the support housing for non-intrusively measuring the liquid level. A secondary liquid level sensor may be mounted in the support housing to sense a predetermined liquid level to prevent accidental overflows. Protective lenses may be placed in front of the primary liquid level sensor.

29 Claims, 7 Drawing Sheets

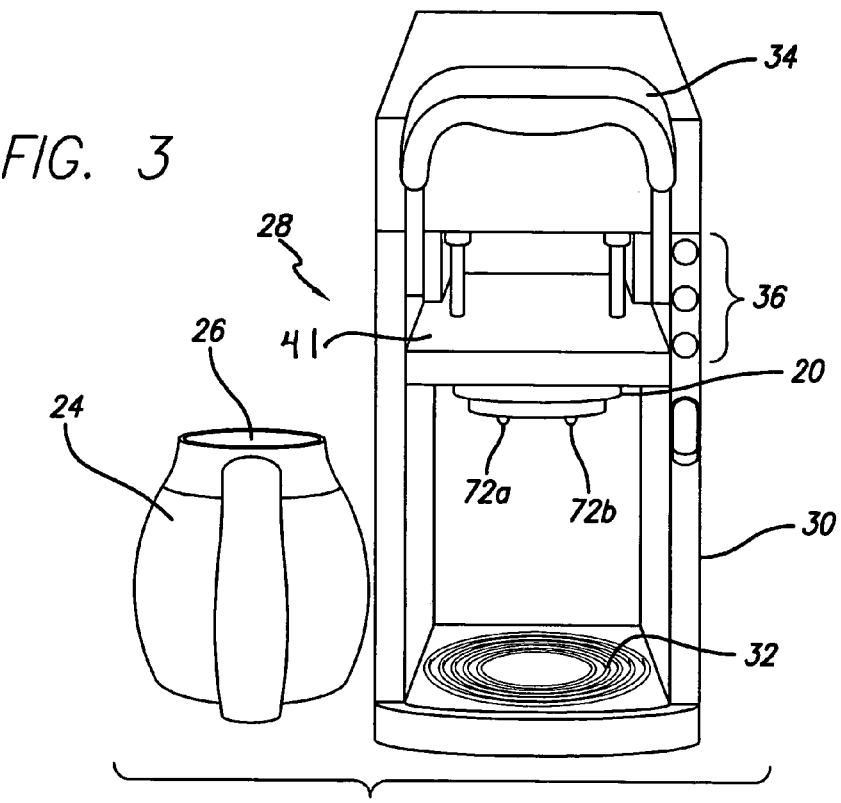
FIG. 3
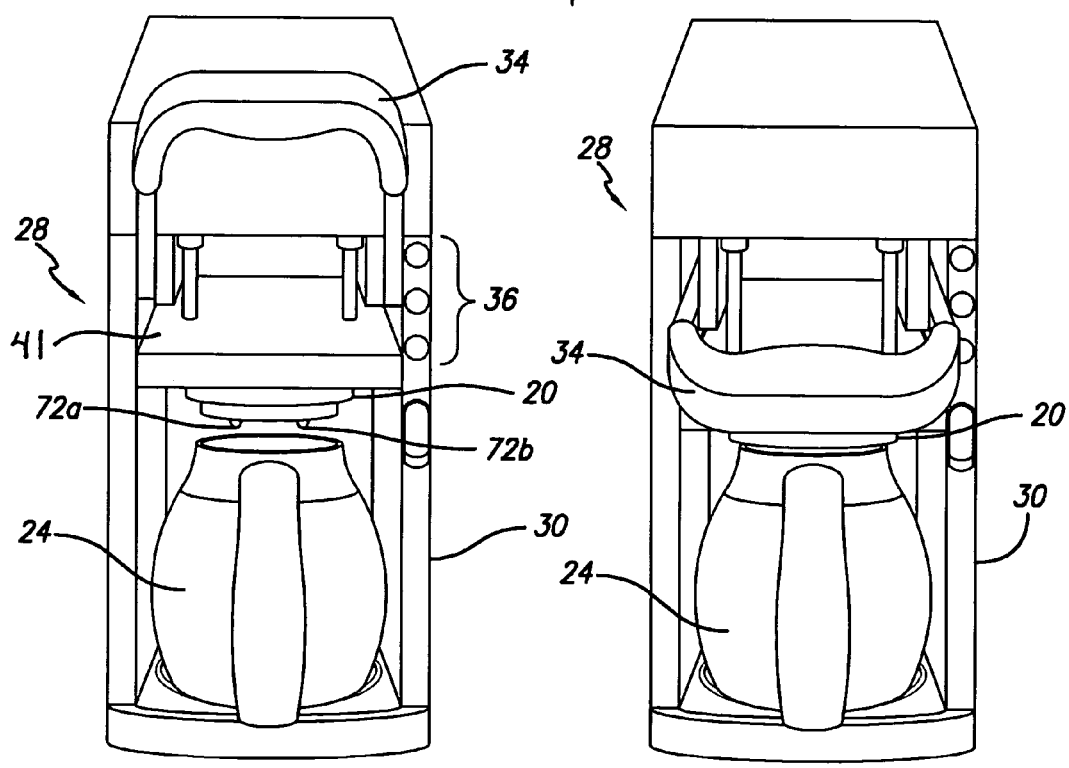
FIG. 4
FIG. 5

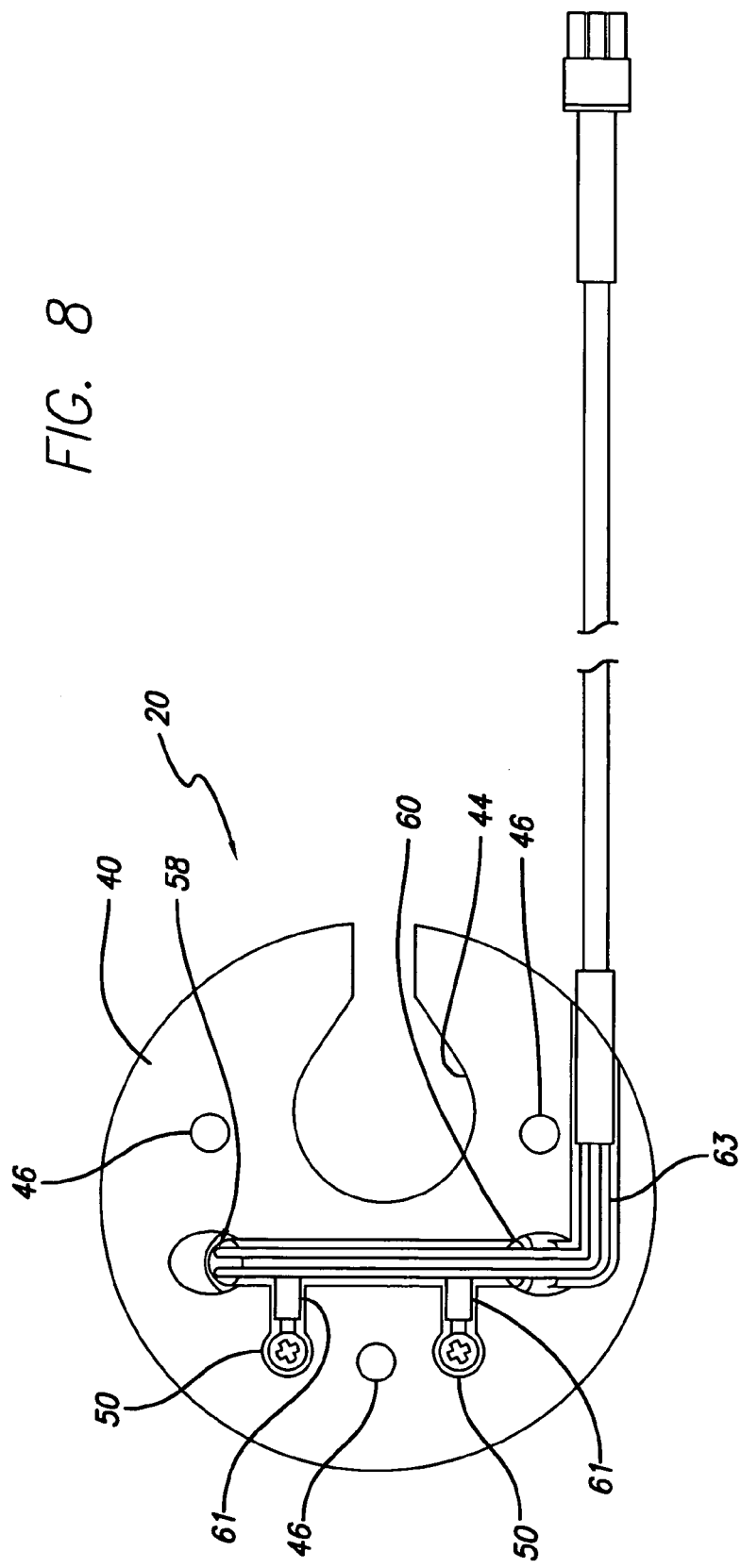

ELECTRO-OPTIC LIQUID LEVEL SENSING SYSTEM FOR AIRCRAFT BEVERAGE BREWING

BACKGROUND OF THE INVENTION

1. Field of the Invention

This invention relates to liquid level detection systems, and more particularly, to a system to detect the liquid level in a server container of a beverage brewing apparatus adapted for use on aircraft.

2. General Background and State of the Art

One conventional technique for determining the level of a liquid in a vessel or container involves mechanically measuring the liquid level with a contact device such as a float indicator, dip stick or probe which extends intrusively into the liquid to be measured. When such techniques are used for measuring liquid level in a server container of a beverage brewing apparatus, such as a coffee brewing machine, these techniques require a sensing device to extend into the server container to contact the liquid, which subjects the sensing device to damage when the server container is repetitively installed and removed from the beverage maker brewing cavity.

One non-contact liquid level sensing technique for non-intrusively detecting the level of the surface of a fluid in a vessel utilizes a laser liquid level gauge that includes an optical unit in the top wall of the vessel. Reflections of an incident laser beam from the fluid boundary are focused by optics to a photodiode producing an output signal received by a control unit, which includes a phase detector for comparing the phase of the modulation tone with that of the detection signal to produce a level indicating signal for display. Another non-contact liquid level sensing technique for measuring the volume of liquid in a container utilizes an ultrasonic system. An ultrasonic signal is emitted from the lid of the container, and is received by a sensor subsystem located on the underside of the lid of the ultrasonic system. The ultrasonic system measures the level of liquid in the container by determining the time the ultrasonic signals take to travel to and return from the surface of the liquid reflecting the ultrasonic signals to the ultrasonic sensor subsystem.

Another liquid level sensing technique utilizes an opto-electronic level sensor including a system with an infrared light emitting diode (IRED) and two silicon phototransistors. A first phototransistor monitors the light reflected from the liquid, and the second phototransistor directly monitors the IRED beam for power degradation or failure and provides interrupt control as required. While the failure of the IRED can be detected directly in this manner, failure of the first phototransistor can go undetected, allowing an overflow to occur. A temperature sensor included with the liquid level sensor that extends intrusively to contact the liquid is also vulnerable to being damaged by repeated usage. Another inherent problem with this approach is that the light emitting and sensing optical sensors are not protected from the steam, water condensation and accumulation of coffee residue, and frequent cleaning operations are required to keep the level sensing system operational, which is time consuming and expensive. Typical cleaning of the liquid level sensors requires inserting a cotton swab moistened with alcohol into the sensor ports, and clearing the sensor ports of lint from the cotton swab. Failure to perform these cleaning operations typically results in uncontrolled overflows due to accumulation of debris and coffee residue on the light emitting and sensing optical sensors. It would therefore be desirable to provide a liquid level sensing device that is less prone to contamination.

Such conventional liquid level sensing systems also typically do not provide any redundancies in the event that the primary sensing apparatus monitoring the liquid level fails, either by internal failure or due to coffee residue build up. Failure to detect the liquid level will result in an overflow, which is not only inconvenient, but also dangerous for the operator. During an overflow, very hot liquid typically comes out of the server and the beverage maker, and spills out, potentially burning the operator attending the machine. It would therefore be desirable to provide a backup liquid level sensing system for preventing accidental overflows in case of a malfunction of a primary liquid level sensing system. The present invention satisfies these and other requirements for aircraft galley systems.

INVENTION SUMMARY

Briefly, and in general terms, the invention provides for an apparatus for detecting a level of a surface of a liquid in a container having an upper opening, such as for a server container of a beverage maker for a transport system, such as for aircraft, trains, trucks, buses and the like.

In one presently preferred embodiment, the apparatus includes a support housing adapted to mate with the upper opening of the container, primary liquid level sensing means mounted in the support housing for non-intrusively measuring the level of the surface of the liquid in the container; and secondary liquid level sensing means mounted in the support housing for intrusively sensing a predetermined level of the surface of the liquid in the container for preventing accidental overflows in the event of a malfunction of the primary liquid level sensing means.

In one aspect, the primary liquid level sensing means may be an optical sensor device mounted in the support housing for non-intrusively measuring the level of the surface of the liquid in the container, the optical sensor device including a light emitting device for projecting incident light on the surface of the liquid in the container, and a light detecting device for detecting the incident light reflected from the surface of the liquid in the container. In one variation, the primary liquid level sensing means may be an ultrasonic level measuring system, for example. In another variation, the primary liquid level sensing means may include means for determining the level of the surface of the liquid in the container by determining a timed flow of liquid into the container.

In another aspect, the secondary liquid level sensing means may include a pair of short fixed electrically conductive probes extending to a predetermined level in the container when the support housing is mated to the upper opening of the container.

In another current aspect, where the container and the liquid in the container are electrically conductive, the secondary liquid level sensing means may include a first retractable, electrically conductive probe pivotally mounted to the support housing and adapted to extend to a predetermined level within the container, and a second electrically conductive probe adapted to contact the container, whereby electrical continuity between the first and second electrically conductive probes indicates that the level of the surface of the liquid in the container has reached the predetermined level within the container.

In another aspect, where the liquid in the container is electrically conductive, the secondary liquid level sensing means may include first and second retractable, electrically conductive probes pivotally mounted to the support housing and adapted to extend to a predetermined level within the container, whereby electrical continuity between the first and second electrically conductive probes indicates that the level of the surface of the liquid in the container has reached the predetermined level within the container.

In another aspect, where the container and the liquid in the container are electrically conductive, the secondary liquid level sensing means may include a retractable, electrically conductive probe pivotally mounted to the support housing and adapted to extend to a predetermined level within the container, and means adapted to contact the container to ground the container, whereby electrical continuity between the electrically conductive probe and ground indicates that the level of the surface of the liquid in the container has reached the predetermined level within the container.

In another presently preferred embodiment, the invention provides for an apparatus for detecting a level of a surface of a liquid in a container having an upper opening. The apparatus includes a support housing adapted to mate with the upper opening of the container, an optical sensor device mounted in the support housing for non-intrusively measuring the level of the surface of the liquid in the container, the optical sensor device including a light emitting device for projecting incident light on the surface of the liquid in the container, and a light detecting device for detecting the incident light reflected from the surface of the liquid in the container, and protective lenses placed in front of the light emitting device and the light detecting device. The protective lenses may be permanently and hermetically secured on the support housing housing, or may be incorporated in the support housing housing.

In another preferred aspect, each of the protective lenses have an outer surface that is inclined with respect to the vertical, to allow condensation to flow off the protective lenses, and each of the protective lenses has an outer surface that is inclined at about 53° with respect to the vertical, to allow condensation to flow off the protective lenses. In another aspect, the protective lenses and the light emitting device and the light detecting device defines a volume in the support housing housing, which may be filled with a dry gas, a vacuum, or a solid translucent material, for example.

In one aspect, the light emitting device is an infrared light emitting diode, and the light detecting device is a phototransistor. In another aspect, the light emitting device is positioned in the support housing to project light at an angle that is about 37° off vertical when the support housing is mounted to the upper opening of the container. In another presently preferred aspect, the light emitting device and the light detecting device are positioned in the support housing so as to project and receive the incident light at an included angle of about 74°.

In another preferred embodiment, the invention provides for an apparatus for detecting a level of a surface of a liquid in a container having an upper opening, including a support housing adapted to mate with the upper opening of the container, and at least one primary retractable liquid level sensing probe pivotally mounted in the support housing for measuring the level of the surface of the liquid in the container. The apparatus may also further include a secondary liquid level sensing probe fixedly mounted in the support housing for sensing a predetermined level of the surface of the liquid in the container for preventing accidental overflows in the event of a malfunction of the primary liquid level sensing means.

The present invention also provides for a method for detecting a level of a surface of a liquid in a container having an upper opening, such as for a server container of a beverage maker for a transport system, such as for aircraft, trains, trucks, buses and the like. A support housing is provided that is adapted to mate with the upper opening of the container, and a primary liquid level sensing means is mounted in the support housing for non-intrusively measuring the level of the surface of the liquid in the container. In one aspect, the primary liquid level sensing means may be an optical sensor device mounted in the support housing for non-intrusively measuring the level of the surface of the liquid in the container, the optical sensor device including a light emitting device, such as an infrared light emitting device, for projecting incident light on the surface of the liquid in the container, and a light detecting device, such as a phototransistor, for detecting the incident light reflected from the surface of the liquid in the container. The light source is typically driven continuously during a brew cycle, but the method of the invention provides for pulsing power to the light emitting device, allowing the system to turn the light emitting device on for only a fraction of the time during which the beverage maker is in operation, thus increasing the useful life of the light emitting device, and/or reducing the power requirements. Although the light detecting device typically continuously measures reflected emitted light, the method of the invention similarly provides for monitoring the light detecting device only when the light emitting device is on, so that the liquid level can be detected at various intervals.

The provision of protective lenses significantly improves protection of non-intrusive primary liquid level sensors such as light emitting and light receiving devices from direct water condensation. In addition, water condensation forming on and above the lenses will run off the outer surfaces of the protective lenses, so that the lenses tend to be cleaned from coffee residue during each brew cycle, requiring no special cleaning of the lenses. Since the lenses are hermetically sealed or integrally formed on the support housing housing, no coffee residue can build up between the non-intrusive primary liquid level sensors and the support housing housing. Therefore the optical system of the invention avoids creation of "dirt traps" which are unacceptable on food processing equipment.

The secondary intrusive backup liquid level sensing probes also advantageously serve to prevent accidental overflows in case of a malfunction of the primary non-intrusive liquid level sensing device. The backup probes provide a high reliability system for preventing accidental overflow, and operate in conjunction with primary non-intrusive liquid level sensing system, so that if one of the liquid level sensing systems fails, the other will stop the brew cycle before the server overflows.

The operation of the backup probes takes advantage of the electrical conductivity of the liquid brewed in the server. The probes are mounted on the support housing housing, and rest above the surface of the liquid brewed. Should the primary liquid level sensor fail to detect the liquid level, the liquid will continue to rise up to the backup probes, and will provide an electrical path between the probes, and electrical conduction between the probes will be detected by a beverage maker decision logic circuit, and the brew cycle will be stopped, preventing an overflow. In an alternative embodiment, a single probe may be utilized if the server is grounded in the sensor electrical circuit.

The backup probes are shorter than are typically used for a primary sensor, so that they do not contact the beverage during normal operation and are much less vulnerable to becoming damaged when the pot is removed or replaced. However, their length is sufficient to contact the beverage before an overflow can occur. The backup probes are much less vulnerable to being damaged during normal operation because the probes are mounted on a support housing which is raised above the server. The support housing is mobile and translates up and down above the server opening. When the support housing is in the "up" or "unlock" position, the server can be inserted in and out of the brew cavity without touching the backup probes, so that wear and tear of the probes is minimized. When the support housing is lowered into the server opening in the "down" or "locked" position, the probes rest at a height adequate to prevent accidental overflows. In one aspect, the backup probes can be passively movable, such as by being pivotally mounted to the support housing so as to extend into the server container when the support housing is lowered into the server opening while allowing the backup probes to pivot as necessary when moved into and out of the server container. In another aspect, the backup probes can be configured to be actively movable, actively extending into the server container when the support housing mates with the server container, and actively retracting when the support housing is raised to the "up' or "unlock" position from the server container.

The backup probes can be used with any other primary liquid level system, including, but not limited to infrared sensing, ultrasonic sensing, capacitive sensing, and retractable probes.

Other features and advantages of the present invention will become more apparent from the following detailed description of the preferred embodiments in conjunction with the accompanying drawings, which illustrate, by way of example, the operation of the invention.

BRIEF DESCRIPTION OF THE DRAWINGS

FIG. 3 is a front view of a beverage maker with the apparatus for detecting a liquid level in a container of FIG. 1 mounted to the beverage maker, and a server container.

FIG. 4 is a front view of a beverage maker with the apparatus for detecting a liquid level in a container of FIG. 1 mounted to the beverage maker, with a server container placed in the beverage maker, with the brew handle shown in the up or unlocked position.

FIG. 5 is a front view showing the apparatus for detecting a liquid level in a container of FIG. 1 mounted to the beverage maker, with the brew handle shown in the down or locked position, and the apparatus for detecting a liquid level mated to a server container.

FIG. 8 is a top plan view of the support housing of the apparatus for detecting a liquid level in a container of FIG. 1.

DETAILED DESCRIPTION OF THE PREFERRED EMBODIMENTS

Figure 1:
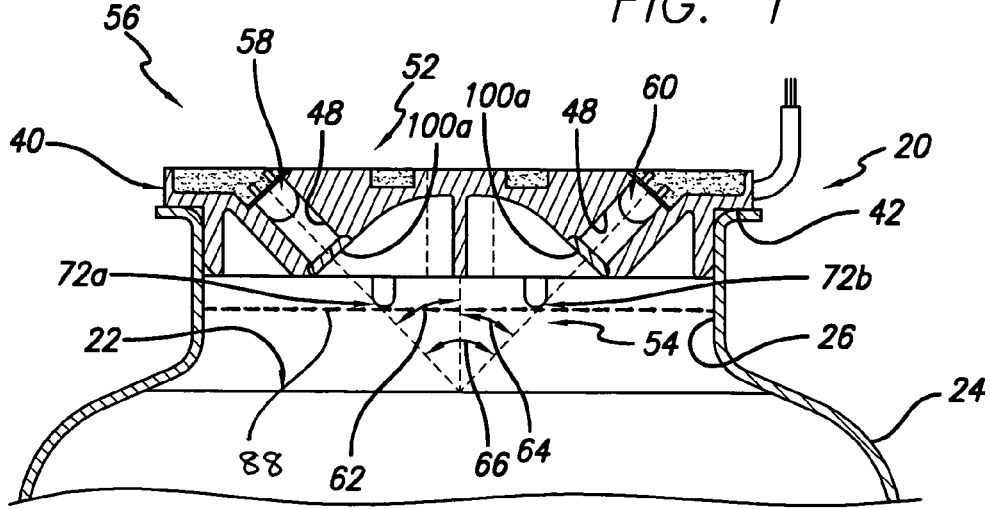
FIG. 1 is an illustration of an apparatus for detecting a liquid level in a container, according to the invention.

The present invention provides for an apparatus for detecting a level of a surface of a liquid in a container having an upper opening, such as for a server container of a beverage maker for a transport system, such as for aircraft, trains, trucks, buses and the like.

In a first embodiment illustrated in FIGS. 1–9, the present invention accordingly provides for an apparatus 20 for detecting a level of a surface of a liquid 22 in a container 24 typically having an upper opening 26 such as a server container of a beverage maker such as a coffee brewer 28 for a transport system (not shown), such as for aircraft, trains, trucks, buses and the like. The beverage maker typically includes an enclosure 30 including a heated platen or hot plate 32 on which the server container is seated in the beverage maker, and a brew handle lever 34 movable between an "up" or "unlocked" position in which the server container may be freely moved into and out of the beverage maker, and a "down" or "locked" position in which the server container is locked in the beverage maker for brewing and receiving the beverage. The beverage maker typically also includes various indicator lights and control switches indicated generally at 36 as well as a brew switch 38.

The liquid level detecting apparatus includes a support housing 40, shown mated to the server container in FIGS. 1 and 5, and shown mounted to a retaining plate 41 moved by the brew handle lever in FIGS. 3–5. Referring to FIGS. 1 and 6–8, the support housing typically includes a shoulder 42 configured to mate with the upper opening of the server container, and at least one opening 44 for introduction of liquid into the server container from the beverage maker. The support housing may also include one or more mounting holes 46 for securing the support housing to the retaining plate. The support housing also includes angled ports 48 for the optical sensing apparatus, as will be described further below, and ports 50 for one or more backup sensor probes shown in FIG. 1, also described further hereinbelow.

Figure 2:
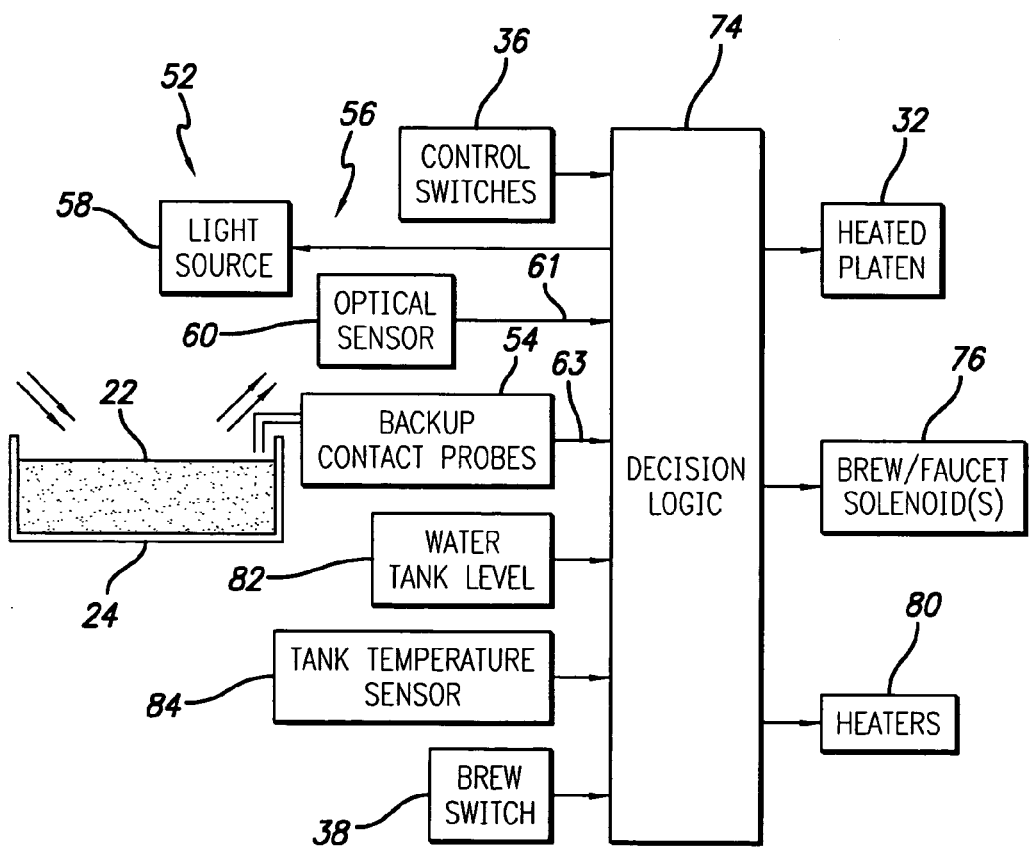
FIG. 2 is a schematic diagram of the apparatus for detecting a liquid level in a container of FIG. 1, shown mounted to a beverage maker.

Referring to FIGS. 1 and 2, in one preferred embodiment, a primary liquid level sensing means 52 is mounted in the support housing for non-intrusively measuring the level of the surface of the liquid in the container. A secondary liquid level sensing means 54 is mounted in the support housing for intrusively sensing a predetermined level of the surface of the liquid in the container for preventing accidental overflows in the event of a malfunction of the primary liquid level sensing means. In a preferred aspect, the primary liquid level sensing means is an electro-optic level sensing apparatus including an optical sensor device 56, including a light emitting device 58, such as an infrared light emitting diode (IRED) for projecting incident light on the surface of the liquid in the container, and a light detecting device 60, such as a phototransistor, for detecting the incident light reflected from the surface of the liquid in the container.

Figure 6:
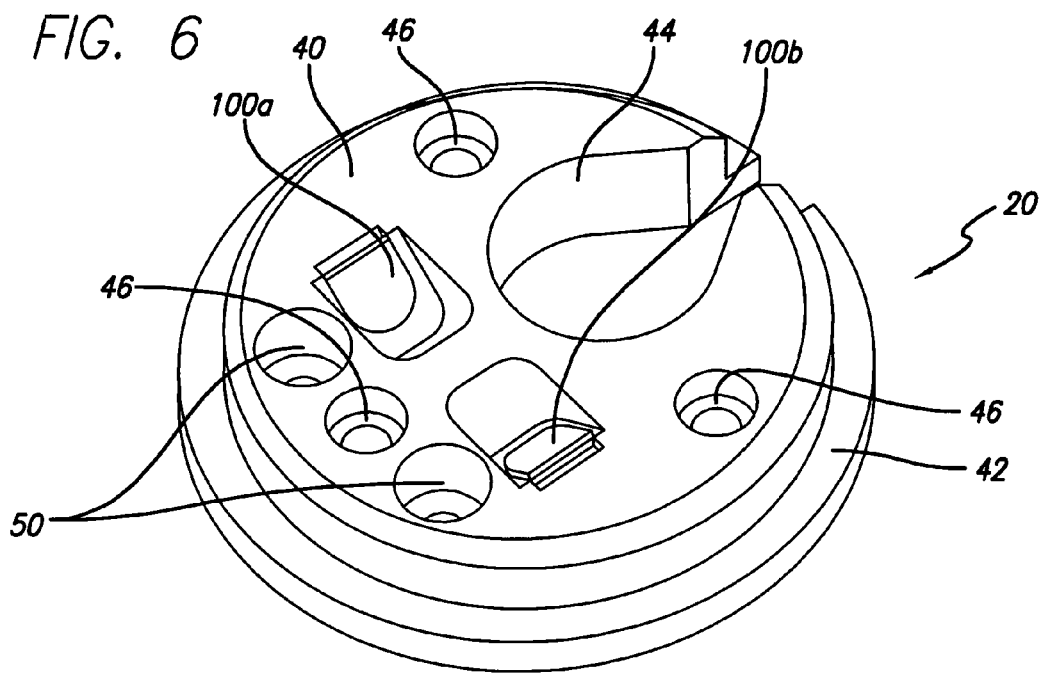
FIG. 6 is a bottom perspective view of the support housing of the apparatus for detecting a liquid level in a container of FIG. 1.
Figure 7:
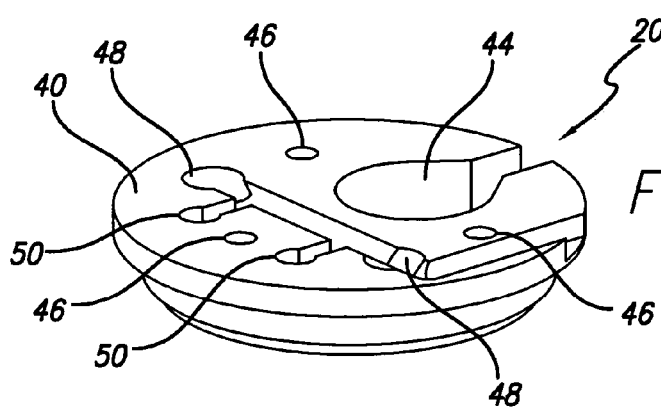
FIG. 7 is a top perspective view of the support housing of the apparatus for detecting a liquid level in a container of FIG. 1.
Figure 9:
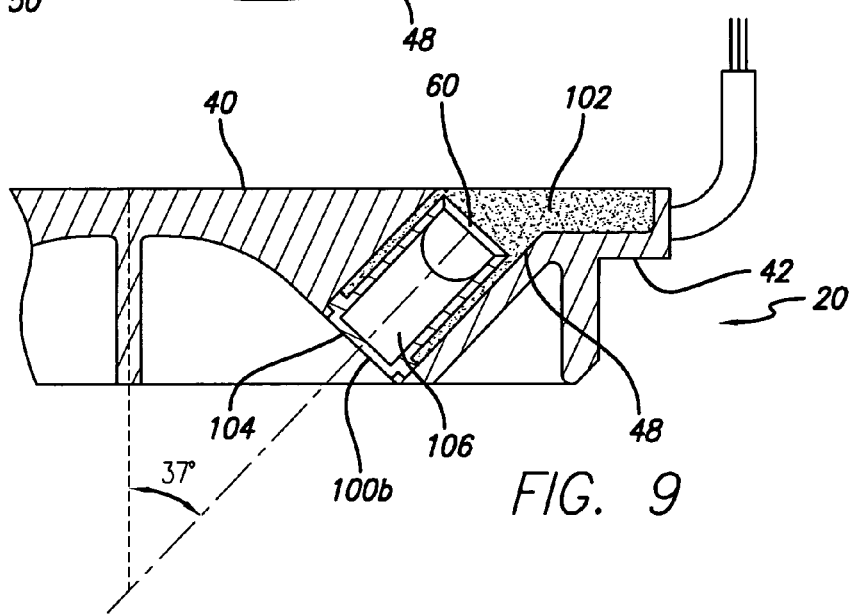
FIG. 9 is a an enlarged cutaway sectional view of a portion of the apparatus for detecting a liquid level in a container of FIG. 1, illustrating an alternate lens design.

While the angle at which the light is projected and received with respect to the vertical when the support housing is horizontally mated to the server container may be greater than 0° and less than 90°, generally the angle will be between about 10° and about 80° with respect to the vertical, depending on the spacing and dimensions of the light emitting device, the light detecting device, the support housing and the server container, as will be further discussed below. Referring to FIGS. 1, 6 and 9, in one preferred aspect, the light emitting device is positioned in the support housing to project light at an angle 62 that is typically about 37° from perpendicular relative to the support housing and about 37° off vertical when the support housing is positioned horizontally when mounted to the upper opening of the container. The light detecting device is similarly positioned in the support housing to receive light at an angle 64 of about 37° from perpendicular relative to the support housing housing, so that together the light emitting device and the light detecting device are positioned in the support housing so as to project and receive the incident light at an included angle 66 of about 74° when the support housing is horizontally mounted to the upper opening of the container.

Figure 10:
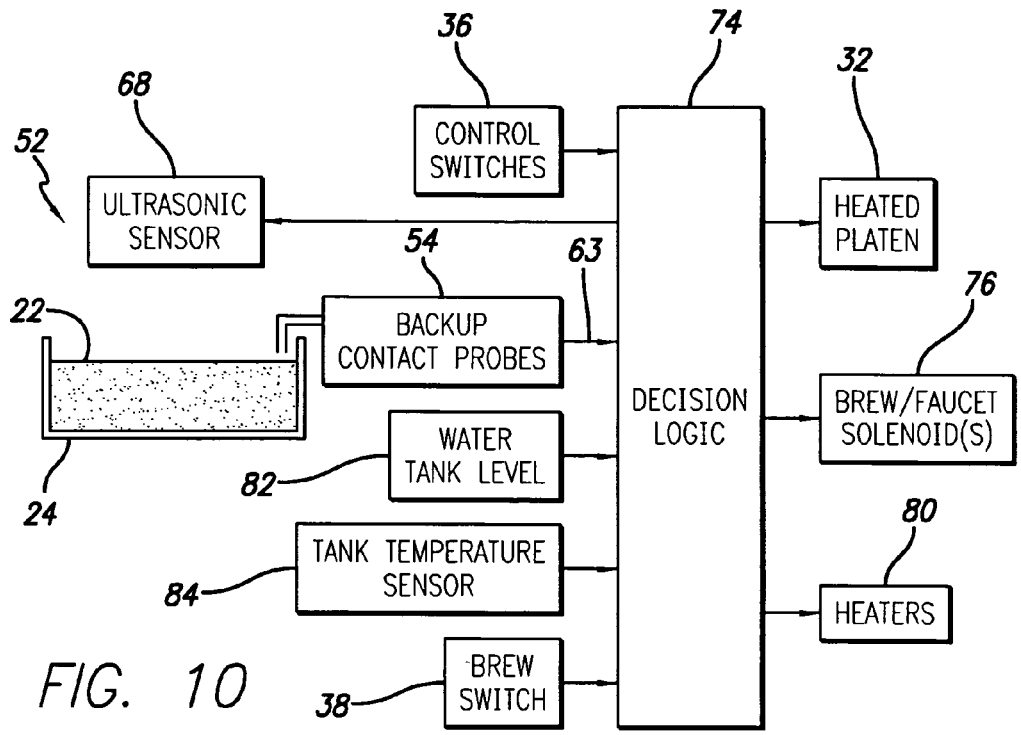
FIG. 10 is a schematic diagram of an alternate embodiment of an ultrasonic apparatus for detecting a liquid level in a container, according to the invention.
Figure 11:
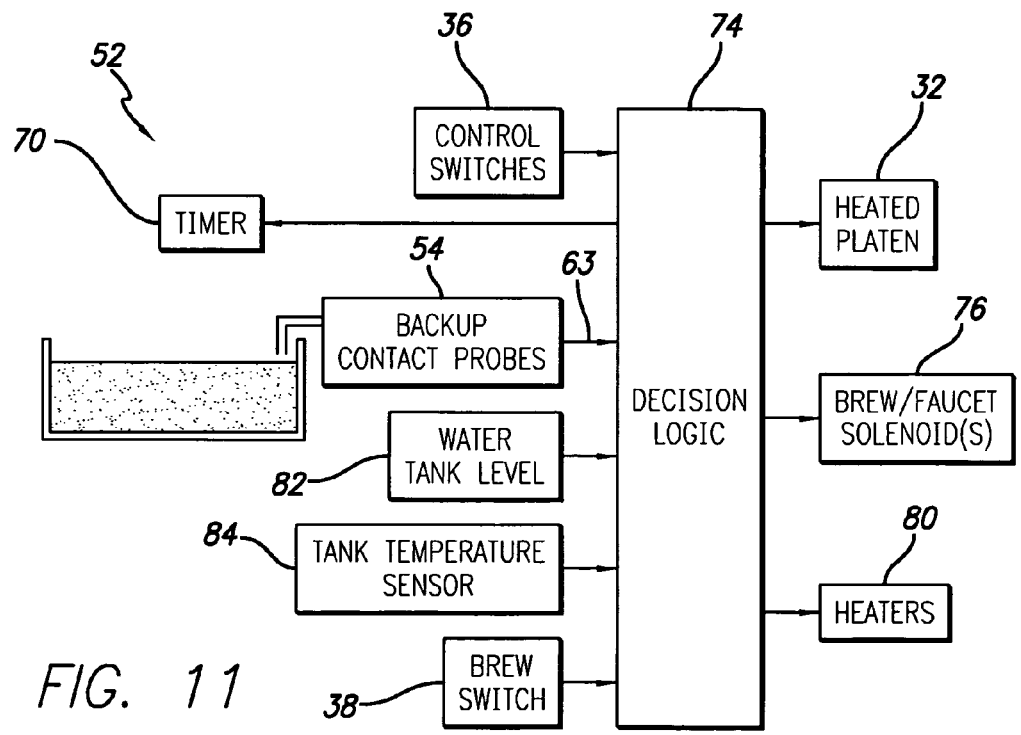
FIG. 11 is a schematic diagram of another alternate embodiment of a timed apparatus for detecting a liquid level in a container, according to the invention.

Referring to FIG. 10, in an alternate embodiment, the primary liquid level sensing means mounted in the support housing for non-intrusively measuring the level of the surface of the liquid in the container may be an ultrasonic level measuring system 68. Referring to FIG. 11, in an alternate embodiment, the primary liquid level sensing means mounted in the support housing for non-intrusively measuring the level of the surface of the liquid in the container may be a timer means 70 for determining the level of the surface of the liquid in the container by determining a timed flow of liquid into the container.

In one embodiment illustrated in FIGS. 1–4, the secondary liquid level sensing means for intrusively sensing a predetermined level of the surface of the liquid in the container includes a pair of short, fixed electrically conductive backup probes 72a, 72b which take advantage of the electrical conductivity of the liquid brewed in the server container. The fixed backup probes are mounted on the support housing housing, and rest above the surface of the liquid brewed, extending to a predetermined level 88 of the liquid in the server container when the support housing is mated to the server container. Should the primary liquid level sensor fail to detect the liquid level, the liquid will continue to rise up to the backup probes, and will provide an electrical path between the probes, and electrical conduction between the probes will be detected by a beverage maker decision logic circuit 74, and the flow of liquid into the server container will be stopped, preventing an overflow. As is illustrated in FIG. 2, the decision logic circuit, typically implemented in a microcontroller, controls brew and faucet solenoids 76, the heated platen 32, heaters 80, as well as light source 58, and receives input from the primary liquid level sensing means via connector 61, and from the secondary liquid level sensing means via connector 63. For controlling filling and temperature of a water tank of the beverage maker, entirely apart from monitoring the liquid level of the server container, the decision logic circuit may also receive inputs from the control switches, the brew switch, an internal water tank level sensor 82, and an internal water tank temperature sensor 84, for safety purposes.

Figure 12:
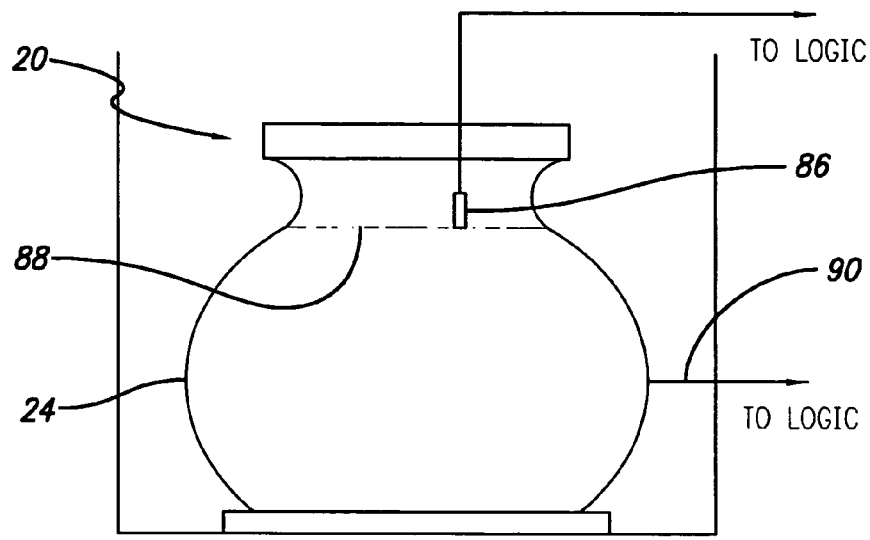
FIG. 12 is a schematic diagram of another alternate embodiment of an apparatus for detecting a liquid level in a container, according to the invention, with a secondary liquid level sensing device including a retractable probe and a second probe adapted to contact the server container.

In another embodiment illustrated in FIG. 12, when the server container and the liquid in the server container are electrically conductive, such as when at least a portion of the server container is made of a metal such as stainless steel, for example, the secondary liquid level sensing means includes a first retractable, electrically conductive probe 86 pivotally mounted to the support housing and adapted to extend to a predetermined level 88 within the container, and a second electrically conductive probe 90 adapted to contact an electrically conductive portion of the server container, whereby electrical continuity between the first and second electrically conductive probes indicates that the level of the surface of the liquid in the container has reached the predetermined level within the container. The second electrically conductive probe may be a pivoting probe or a leaf spring contact, for example. Alternatively, the second electrically conductive probe may be mounted on the support housing so as to contact the server container when the brew handle lever is moved downwardly to a "down" or "locked" position.

Figure 13:
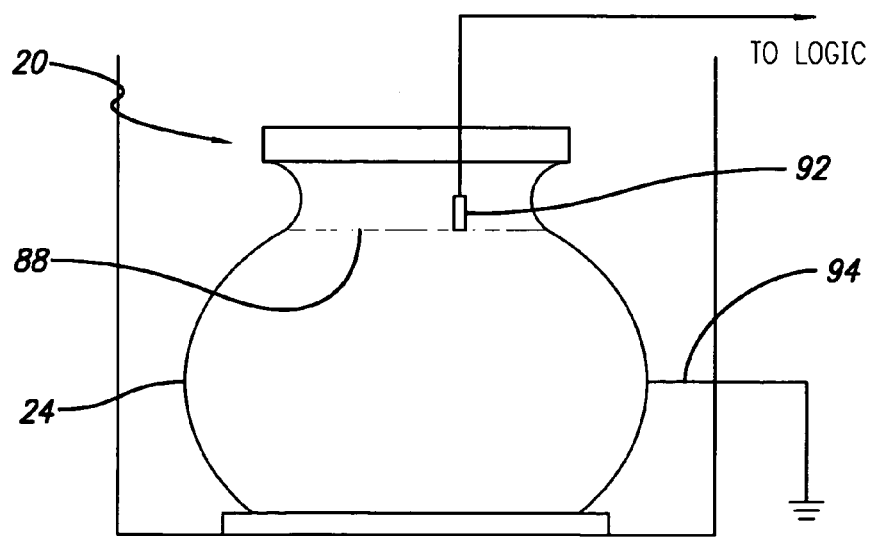
FIG. 13 is a schematic diagram of another alternate embodiment of an apparatus for detecting a liquid level in a container, similar to FIG. 12, in which the second probe connects to ground.

In another embodiment illustrated in FIG. 13, when the server container and the liquid in the server container are electrically conductive, such as when at least a portion of the server container is made of a metal such as stainless steel, for example, the secondary liquid level sensing means includes a retractable electrically conductive probe 92 pivotally mounted to the support housing and adapted to extend to a predetermined level 88 within the server container, and contact means 94 adapted for contacting and connecting the server container to ground the server container, whereby electrical continuity between the electrically conductive probe and ground indicates that the level of the surface of the liquid in the container has reached the predetermined level within the container. The second electrically conductive probe may be a pivoting probe or a leaf spring contact, for example. Alternatively, the second electrically conductive probe may be mounted on the support housing so as to contact the server container when the brew handle lever is moved downwardly to a "down" or "locked" position.

Figure 14:
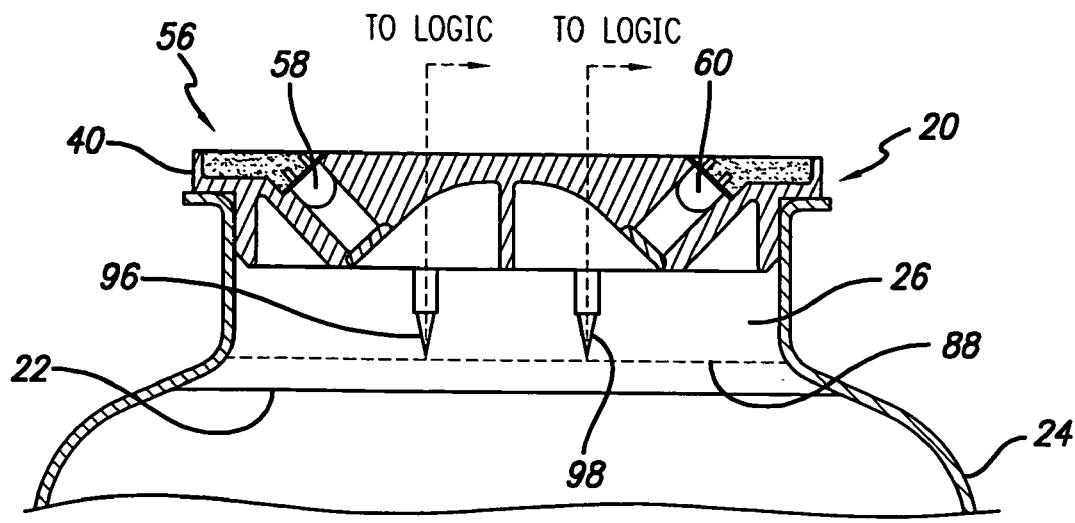
FIG. 14 is a schematic diagram of another alternate embodiment of an apparatus for detecting a liquid level in a container, according to the invention, with a secondary liquid level sensing device including a pair of retractable probes.

In another embodiment illustrated in FIG. 14, the secondary liquid level sensing means for intrusively sensing a predetermined level of the surface of the liquid in the container includes a first electrically conductive probe 96 and a second electrically conductive probe 98, each of which are movably mounted to the support housing and are adapted to extend to a predetermined level 88 within the container. In one aspect, the first and second electrically conductive probes may be pivotally mounted to the support housing so as to be able to be passively moved to avoid damage to the probes. In another aspect, the first and second electrically conductive probes may be configured to be actively movable, mechanically or electrically actively extending into the server container when the support housing mates with the server container, and mechanically or electrically actively retracting when the support housing is raised to the "up" or "unlock" position from the server container. Electrical continuity between the first and second electrically conductive probes indicates that the level of the surface of the liquid in the container has reached the predetermined level within the container.

In another preferred aspect illustrated in FIGS. 1, 6 and 9, a protective window or lens 100a is placed in front of the light emitting device, and a protective window or lens 100b is placed in front of the light detecting device. The protective lenses are preferably permanently and hermetically secured on the support housing housing, such as by a sealing compound 102 such as an epoxy compound, for example, although the protective lenses alternatively may be incorporated in the support housing housing, such as by forming the support housing of material that would be transparent to the spectrum of light emitted and detected, such as infrared light spectrum, for example. The advantage of this approach would be to streamline manufacturing by eliminating the need to assemble the lenses onto the support housing housing. Each of the protective lenses preferably has an outer surface 104 that is inclined at an angle with respect to the vertical, when the support housing is mounted horizontally to the service container, to allow condensation and contaminants to flow off the protective lenses. While the angle of the lenses with respect to the vertical may be greater than 0° and less than 90°, generally the angle of the lenses should be sufficiently displaced from the horizontal to facilitate drainage of liquid and contaminants from the lenses, and may, for example, be generally between about 10° and about 80°, with respect to the vertical. One convenient approach is to choose angles for the lenses that are perpendicular to the angles of the light emitting device and the light detecting device, but this is not essential. In a preferred aspect, the protective lenses are typically inclined at an angle of about 53° with respect to the vertical, when the support housing is mounted horizontally to the service container. In another preferred aspect, a volume 106 defined between a protective lens and the light emitting device, and between a protective lens and the light detecting device, is filled with a dry gas, a vacuum, or a solid translucent material.

Figure 15:
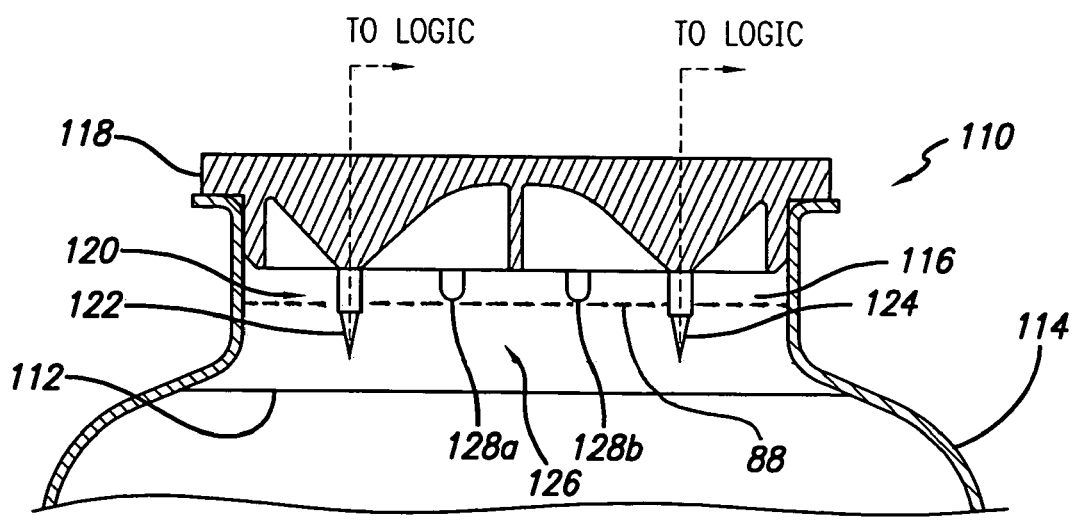
FIG. 15 is a schematic diagram of another alternate embodiment of an apparatus for detecting a liquid level in a container, according to the invention, with a primary liquid level sensing device including a pair of retractable probes.

In another embodiment illustrated in FIG. 15, the invention provides for an apparatus 110 for detecting a level of a surface of a liquid 112 in a server container 114 typically having an upper opening 116, such as a server container of a beverage maker such as a coffee brewer described above. The apparatus includes a support housing cover 118 adapted to mate with the upper opening of the server container, and a primary liquid level sensing means 120 including at least one primary liquid level sensing probe 122 pivotally mounted in the support housing for measuring the level of the surface of the liquid in the container. A second primary liquid level sensing probe 124 may also be pivotally mounted in the support housing for measuring the level of the surface of the liquid in the container. A secondary liquid level sensing means 126 is fixedly mounted in the support housing for sensing a predetermined level 88 of the surface of the liquid in the container for preventing accidental overflows in the event of a malfunction of the primary liquid level sensing means. In one embodiment illustrated in FIG. 15, the secondary liquid level sensing means for intrusively sensing a predetermined level of the surface of the liquid in the container includes a pair of fixed electrically conductive backup probes 128a, 128b which take advantage of the electrical conductivity of the liquid brewed in the server container. The fixed backup probes are mounted on the support housing housing, and rest above the surface of the liquid brewed when the support housing is mated to the server container. Should the primary liquid level sensor fail to detect the liquid level, the liquid will continue to rise up to the backup probes, and will provide an electrical path between the probes, and electrical conduction between the probes will be detected by a beverage maker decision logic circuit as described above, and the flow of liquid into the server container will be stopped, preventing an overflow.

It should be appreciated that any of the foregoing secondary systems may be substituted for fixed backup probes for use in combination with any of the foregoing primary liquid level sensing systems.

The present invention also provides for a method for detecting a level of a surface of a liquid in a container having an upper opening, such as a server container of a beverage maker such as a coffee brewer for a transport system. Apparatus for detecting the liquid level is provided, including a support housing adapted to mate with the upper opening of the container, with a primary liquid level sensing means mounted in the support housing for non-intrusively measuring the level of the surface of the liquid in the container, and a secondary liquid level sensing means mounted in the support housing for intrusively sensing a predetermined level of the surface of the liquid in the container for preventing accidental overflows in the event of a malfunction of the primary liquid level sensing means. The primary liquid level sensing means comprises an optical sensor device mounted in the support housing for non-intrusively measuring the level of the surface of the liquid in the container, the optical sensor device including a light emitting device for projecting incident light on the surface of the liquid in the container, and a light detecting device for detecting the incident light reflected from the surface of the liquid in the container, as described above.

Typically, the light source, such as an IRED, for example, is driven continuously during the brew cycle. In the improved method of the invention, the power to the light source is intermittently pulsed, allowing the system to periodically turn the light source on only a fraction of the time, thus increasing the useful life of the light source, and/or reducing the power requirements. Reflected emitted light may be measured continuously with the phototransistor, but the phototransistor can be monitored only when the light source is on, so that the liquid level can be detected periodically, at various desired intervals.

While the specification describes particular embodiments of the present invention, those of ordinary skill can devise variations of the present invention without departing from the inventive concept

We claim:

1. Apparatus for detecting a level of a surface of a liquid in a container having an upper opening, that apparatus comprising:

a support housing moveable between an upward unlocked position and a downward locked position, said support housing being adapted to mate with the upper opening of the container in said downward locked position;

an optical sensor device mounted in said support housing for non-intrusively measuring the level of the surface of the liquid in the container, said optical sensor device including a light emitting device for projecting incident light on the surface of the liquid in the container, and a light detecting device for detecting said incident light reflected from the surface of the liquid in the container; and protective lenses placed in front of the light emitting device and the light detecting device.

2. The apparatus of claim 1, wherein said light emitting device comprises an infrared emitting diode, and said light detecting device comprises a phototransistor.

3. The apparatus of claim 1, wherein said light emitting device is positioned in said support housing to project light at an angle that is about 10° to 80° off vertical when said support housing is mounted to the upper opening of the container.

4. The apparatus of claim 1, wherein said light emitting device is positioned in said support housing to project light at an angle that is about 37° off vertical when said support housing is mounted to the upper opening of the container.

5. The apparatus of claim 1, wherein said light detecting device is positioned in said support housing to receive said incident light at an angle that is about 37° off vertical when said support housing is mounted to the upper opening of the container.

6. The apparatus of claim 1, wherein said light emitting device and said light detecting device are positioned in said support housing so as to project and receive said incident light at an included angle of about 74°.

7. The apparatus of claim 1, wherein said protective lenses are permanently and hermetically secured on the support housing.

8. The apparatus of claim 1, wherein said protective lenses are incorporated in said support housing.

9. The apparatus of claim 1, wherein each of said protective lenses has an outer surface that is inclined with respect to the vertical, to allow condensation to flow off the protective lenses.

10. The apparatus of claim 1, wherein each of said protective lenses has an outer surface that is inclined at about 10° to 80° with respect to the vertical, to allow condensation to flow off the protective lenses.

11. The apparatus of claim 1, wherein each of said protective lenses has an outer surface that is inclined at about 53° with respect to the vertical, to allow condensation to flow off the protective lenses.

12. The apparatus of claim 1, wherein said protective lenses and said light emitting device and said light detecting device define a volume in said support housing filled with a dry gas.

13. The apparatus of claim 1, wherein said protective lenses and said light emitting device and said light detecting device define a volume in said support housing filled with a vacuum.

14. The apparatus of claim 1, wherein said protective lenses and said light emitting device and said light detecting device defines a volume in said support housing filled with a solid translucent material.

15. Apparatus for detecting a level of a surface of a liquid in a server container of a beverage maker for a transport system, said server container having an upper opening, that apparatus comprising:
   a support housing moveable between an upward unlocked position and a downward locked position, said support housing being adapted to mate with the upper opening of the server container in said downward locked position;
   an optical sensor device mounted in said support housing for non-intrusively measuring the level of the surface of the liquid in the server container, said optical sensor device including a light emitting device for projecting incident light on the surface of the liquid in the server container, and a light detecting device for detecting said incident light reflected from the surface of the liquid in the server container; and
   protective lenses placed in front of the light emitting device and the light detecting device.

16. The apparatus of claim 15, wherein said light emitting device comprises an infrared emitting diode, and said light detecting device comprises a phototransistor.

17. The apparatus of claim 15, wherein said light emitting device is positioned in said support housing to project light at an angle that is about 10° to 80° off vertical when said support housing is mounted to the upper opening of the server container.

18. The apparatus of claim 15, wherein said light detecting device is positioned in said support housing to receive said incident light at an angle that is about 10° to 80° off vertical when said support housing is mounted to the upper opening of the server container.

19. The apparatus of claim 15, wherein said light emitting device is positioned in said support housing to project light at an angle that is about 37° off vertical when said support housing is mounted to the upper opening of the server container.

20. The apparatus of claim 15, wherein said light detecting device is positioned in said support housing to receive said incident light at an angle that is about 37° off vertical when said support housing is mounted to the upper opening of the server container.

21. The apparatus of claim 15, wherein said light emitting device and said light detecting device are positioned in said support housing so as to project and receive said incident light at an included angle of about 74°.

22. The apparatus of claim 15, wherein said protective lenses are permanently and hermetically secured on the support housing.

23. The apparatus of claim 15, wherein said protective lenses are incorporated in said support housing.

24. The apparatus of claim 15, wherein each of said protective lenses has an outer surface that is inclined with respect to the vertical, to allow condensation to flow off the protective lenses.

25. The apparatus of claim 15, wherein each of said protective lenses has an outer surface that is inclined at about 10° to 80° with respect to the vertical, to allow condensation to flow off the protective lenses.

26. The apparatus of claim 15, wherein each of said protective lenses has an outer surface that is inclined at about 53° with respect to the vertical, to allow condensation to flow off the protective lenses.

27. The apparatus of claim 15, wherein said protective lenses and said light emitting device and said light detecting device define a volume in said support housing filled with a dry gas.

28. The apparatus of claim 15, wherein said protective lenses and said light emitting device and said light detecting device define a volume in said support housing filled with a vacuum.

29. The apparatus of claim 15, wherein said protective lenses and said light emitting device and said light detecting device define a volume in said support housing filled with a solid translucent material.

* * * * *